(12) United States Patent
Pawar et al.

(10) Patent No.: US 8,036,225 B1
(45) Date of Patent: Oct. 11, 2011

(54) ENHANCED RANGING IN WIMAX

(75) Inventors: Hemanth Balaji Pawar, Herndon, VA (US); Esmail Dinan, Herndon, VA (US); Daniel Vivanco, Herndon, VA (US); Vijay Rudraraju, Herndon, VA (US); Howard Anderson, Ashburn, VA (US)

(73) Assignee: Clear Wireless LLC, Kirkland, WA (US)

( * ) Notice: Subject to any disclaimer, the term of this patent is extended or adjusted under 35 U.S.C. 154(b) by 756 days.

(21) Appl. No.: 12/121,230

(22) Filed: May 15, 2008

(51) Int. Cl.
*H04L 12/28* (2006.01)
*H04L 12/56* (2006.01)

(52) U.S. Cl. ............ 370/395.21; 370/395.4; 370/395.42

(58) Field of Classification Search ............. 370/230, 370/235, 395.21, 395.4, 395.42; 455/450
See application file for complete search history.

(56) References Cited

U.S. PATENT DOCUMENTS

| | | | |
|---|---|---|---|
| 7,457,632 B2 * | 11/2008 | Takagi et al. | 455/507 |
| 2002/0006156 A1 * | 1/2002 | Belaiche | 375/130 |
| 2006/0052103 A1 * | 3/2006 | Mikoshiba et al. | 455/435.3 |
| 2006/0056359 A1 * | 3/2006 | Franke et al. | 370/335 |
| 2007/0058544 A1 * | 3/2007 | Kim et al. | 370/230 |
| 2007/0060180 A1 * | 3/2007 | Muharemovic et al. | 455/509 |
| 2008/0144493 A1 * | 6/2008 | Yeh | 370/230 |
| 2009/0034602 A1 * | 2/2009 | Ancora et al. | 375/232 |
| 2009/0201862 A1 * | 8/2009 | Okker et al. | 370/329 |
| 2009/0232234 A1 * | 9/2009 | Du | 375/260 |
| 2010/0091651 A1 * | 4/2010 | Chin et al. | 370/230 |
| 2010/0290352 A1 * | 11/2010 | Oyman et al. | 370/252 |

* cited by examiner

*Primary Examiner* — Chi H Pham
*Assistant Examiner* — Farah Faroul
(74) *Attorney, Agent, or Firm* — McDonnell Boehnen Hulbert & Berghoff LLP

(57) ABSTRACT

Disclosed herein is a method and system for WiMAX ranging using OVSF ranging codes. Specifically, in an exemplary embodiment, a WiMAX communication system that is configured to provide service at a plurality of quality of service (QoS) levels, may be configured to (a) broadcast a QoS level message in a downlink sub-frame, wherein the QoS level message comprises one or more spreading factor codes, and wherein each spreading factor code indicates a spreading factor for a particular QoS level, (b) receive a ranging request from a device, wherein the ranging request comprises an orthogonal variable spreading factor (OVSF) code, wherein the OVSF code was selected according to the one or more spreading factor codes, (c) determine a spreading factor of the OVSF code in the received ranging request, and (d) use the spreading factor as a basis for selecting a QoS level at which to provide service to the device.

19 Claims, 7 Drawing Sheets

ENHANCED RANGING IN WIMAX

RELATED APPLICATION

The co-owned U.S. patent application entitled "Dynamic Allocation of WiMAX Ranging Codes" (Dinan et al.), Ser. No. 12/124,307, filed on May 21, 2008, is incorporated by reference, in its entirety.

BACKGROUND

The recent introduction of WiMAX technology promises to further increase the proliferation of wirelessly-equipped devices. WiMAX (Worldwide Interoperability for Microwave Access) is an Institute of Electrical and Electronics Engineers (IEEE) standard, designated 802.16, with the 802.16e being the current version of the standard (the terms "IEEE 802.16," "IEEE 802.16e," and "WiMAX" may be used interchangeably herein). WiMAX provides a robust mechanism for wireless communication between base stations and subscriber stations. In particular, WiMAX is designed to provide fixed, portable or non-line-of-sight service with a potential range of 6 miles, a potential bandwidth on the order of 40 megabits per second, and superior quality of service and security.

WiMAX chipsets that provide for communication in accordance with the WiMAX protocol are becoming increasingly prevalent as standard or optional equipment not only in traditional wireless communications devices, such as cellular phones and personal digital assistants, but also in devices that, heretofore, were not used for access to telephony networks. These devices include portable music players, entertainment devices such as game players, automobiles, domestic appliances and so on. It is expected that by the year 2009 there will be in excess of 100 million devices in use that have WiMAX chipsets in them. Thus, a virtual explosion of the number of WiMAX devices is expected to occur in the near future.

In a WiMAX network, users may connect to a WiMAX base station using different timing characteristics and/or power levels. For example, characteristics of a device's connection such as timing, power, and/or transmit frequency offset may be adjusted depending on the location of the user and the user's distance from a base station, as well as other factors. To make such adjustments for a connection, WiMAX defines various ranging processes.

Generally, WiMAX involves four ranging processes: initial ranging, periodic ranging, bandwidth requests, and handoff ranging. Initial ranging may be used to make adjustments prior to establishing network connectivity. Periodic ranging may be similar to initial ranging, but occurs after a connection is established, and helps periodically adjust characteristics of the connection (for example, if a user changes location or network conditions change, periodic ranging may be used to update the parameters of the user's connection). A bandwidth request may be sent when a user desires more or less bandwidth. Lastly, handoff ranging requests may help transfer a WiMAX connection from one WiMAX base station to another, so that a user can freely roam between coverage areas of different base stations.

To initiate these ranging processes, a WiMAX device may send ranging requests. According to IEEE 802.16e, there are 256 different ranging codes that can be used for ranging requests. Each of the 256 ranging codes takes the form of a 144-bit Code Division Multiple Access (CDMA) code. Of the 256 ranging codes, 64 are assigned to each ranging process (e.g., 64 initial ranging codes, 64 periodic ranging codes, etc.). Alternatively, some vendors are building chipsets implementing a smaller fixed number of ranging codes for each ranging process. For example, a chipset might allocate 32 ranging codes for handoff ranging requests, 20 ranging codes for bandwidth requests and four codes for both initial and periodic ranging. In any event, with a fixed set of ranging codes available to request each type of ranging process, a base station receiving a ranging request can identify which ranging process is being requested based on the ranging code.

When a WiMAX base station receives a ranging request, the base station may send the client device a ranging response that tells the client device to adjust its power and timing in some manner. After the client device makes the adjustment(s) specified in the ranging response, the client device sends a new initial ranging request to the base station using the adjusted parameters. This back and forth process will continue until the base station is satisfied with the power and timing characteristics for the connection.

Overview

With existing WiMAX ranging processes, it is possible for a base station to send a ranging response to the incorrect client device. Specifically, after a connection is established a WiMAX base station usually identifies a connection with a client device using a connection ID (CID). When a ranging request is first received, the base station sends the first ranging response using a CID of 0x0000. Since this CID does not specifically identify the connection, the base station typically identifies the client device by the ranging code included in the ranging request from the device. However, according to the Hadamard matrix structure, which is well known in the art, the 144-bit CDMA codes used for ranging only provide 144 orthogonal codes. Since WiMAX currently provides 256 ranging codes, existing WiMAX ranging codes are not orthogonal. As a result, bit errors may cause the base station to decode the incorrect ranging code, and thus send a ranging response to the incorrect WiMAX device. In this scenario, the ranging response does not reach the client device that sent the initial ranging request, and the client device will unnecessarily continue to send initial ranging requests at higher power and/or with different ranging codes.

Due to these and other shortcomings in WiMAX, methods and systems that improve the certainty of ranging responses and/or allow a base station to differentiate among users during the ranging process are desirable. Accordingly, disclosed herein is a method and system for ranging that helps provide different quality of service (QoS) to different client devices, among other benefits. For example, a service provider such as Sprint may provide users paying for premium WiMAX service with more bandwidth, or give such premium users priority for bandwidth as compared to users paying for standard WiMAX service or other QoS levels.

In one aspect, a method for ranging is disclosed. The method may be carried out in a WiMAX communication system configured to provide service at a plurality of QoS levels. The method comprises (a) broadcasting a QoS level message in a downlink sub-frame, wherein the QoS level message comprises one or more spreading factor codes, and wherein each spreading factor code indicates a spreading factor for a particular QoS level, (b) receiving a ranging request from a device, wherein the ranging request comprises an orthogonal variable spreading factor (OVSF) code, wherein the OVSF code was selected according to the one or more spreading factor codes, (c) determining a spreading factor of the OVSF code in the received ranging request, and (d) using the spreading factor as a basis for selecting a QoS level at which to provide service to the device.

The QoS level message may be broadcast in an uplink MAP (UL-MAP) message or a downlink MAP (DL-MAP) message, both of which are part of the downlink sub-frame in a WiMAX data frame. Further, the QoS level message may comprise one or more code pairs, wherein each code pair comprises a QoS level code and a spreading factor code that indicates the spreading factor for the QoS level code. Alternatively or additionally, the spreading factor codes may be included in the QoS level message in a predefined order, wherein the predefined order indicates which of the one or more spreading factor codes indicates the spreading factor for which of the one or more QoS levels.

In a second aspect, a method for WiMAX ranging is disclosed. The method may be carried out by a client device to request service from a WiMAX base station configured to provide service at a plurality of QoS levels. The method comprises (a) receiving a QoS level message, wherein the QoS level message comprises one or more spreading factor codes, wherein each spreading factor code indicates a spreading factor for a particular QoS level, (b) determining a desired QoS level at which to request service from the WiMAX base station, (c) using the spreading factor codes as a basis for selecting an OVSF ranging code having the spreading factor for the desired QoS level, and (d) sending a ranging request to the WiMAX base station, wherein the ranging request comprises the selected OVSF code. According to an exemplary embodiment, the ranging request may be an initial ranging request, a periodic ranging request, a bandwidth request, or a hand-off ranging request, for instance.

In another aspect, a WiMAX communication system configured to perform ranging and to provide service at a plurality of QoS levels is disclosed. The system comprises (a) a transmitter operable to broadcast a QoS level message, wherein the QoS level message comprises one or more spreading factor codes, and wherein each spreading factor code indicates a spreading factor for a particular QoS level and (b) a receiver operable to receive a ranging request from a device, wherein the ranging request comprises an OVSF ranging code having a spreading factor selected by the device based at least in part on the spreading factor codes. The WiMAX communication system is further configured to (i) determine the spreading factor of the OVSF code in the received ranging request and (ii) use the spreading factor as a basis for selecting a QoS level at which to provide service to the device.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Disclosed herein is a method and system for WiMAX ranging. The method and system are described by way of example, with reference to the current WiMAX ranging processes (initial ranging, periodic ranging, bandwidth ranging, and handoff ranging). It should be understood, however, that the invention may extend to include other types of ranging processes, and systems implementing varying combinations of ranging processes.

In an exemplary embodiment, variable-length orthogonal ranging codes or OVSF ranging codes may be utilized to help improve the accuracy of ranging responses, differentiate among client devices during ranging processes, and/or provide prioritized QoS ranging (e.g., service at various QoS levels). Specifically, a base station may provide a client device with QoS level information indicating a spreading factor that corresponds to each QoS level that is provided by the base station. With this information, a client device may send a ranging request that includes an OVSF ranging code having a spreading factor that corresponds to the QoS level desired by the device.

Figure 1:
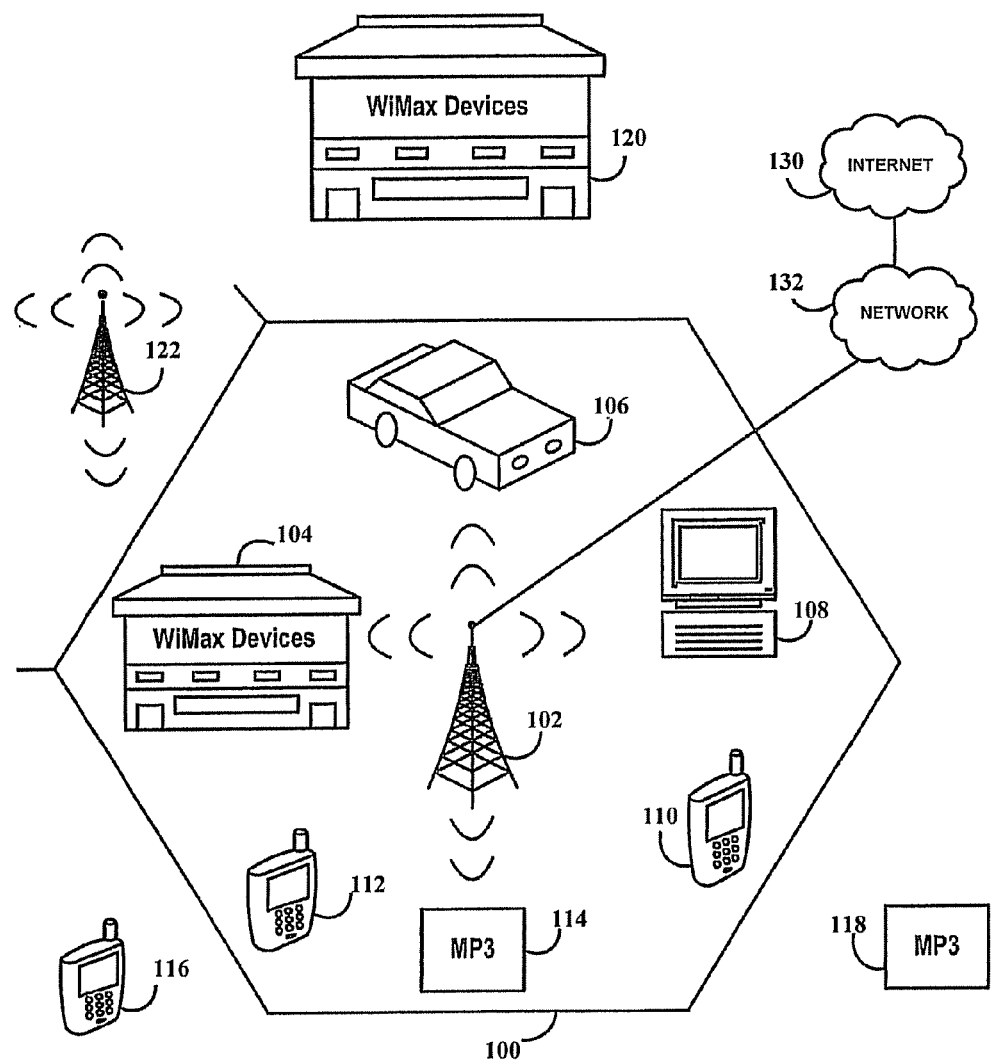
FIG. 1 is schematic representation of a coverage area of a WiMAX base station according to an exemplary embodiment.

FIG. 1 is schematic representation of a coverage area 100 where service is available from a WiMAX base station 102. Also shown is a plurality of WiMAX client devices which may compete for ranging resources of the WiMAX base station 102. The client devices may take the form of, for example, WiMAX devices located in a building or home 104, such as computer, appliance or cell phone, WiMAX devices located in an automobile 106, a portable computer 108, a cellular telephone 110, a personal digital assistant 112, an MP3 player 114, another cell phone 116, another MP3 player 118 and/or various WiMAX devices located within an office building 120 such as computers, cell phones, game players, etc. Adjacent areas may be covered by other base stations, one of which is shown as base station 122.

Provided with a WiMAX connection, a client device may engage in various types of communication. For instance, a WiMAX base station 102 may provide connectivity to a packet-switched network 130 such as the Internet. Packet-data connectivity may be provided via a service provider's network 132 or directly. In addition to packet-data connectivity, a WiMAX connection may also provide access to other services such as voice-over-IP (VOIP), among others.

Figure 2:
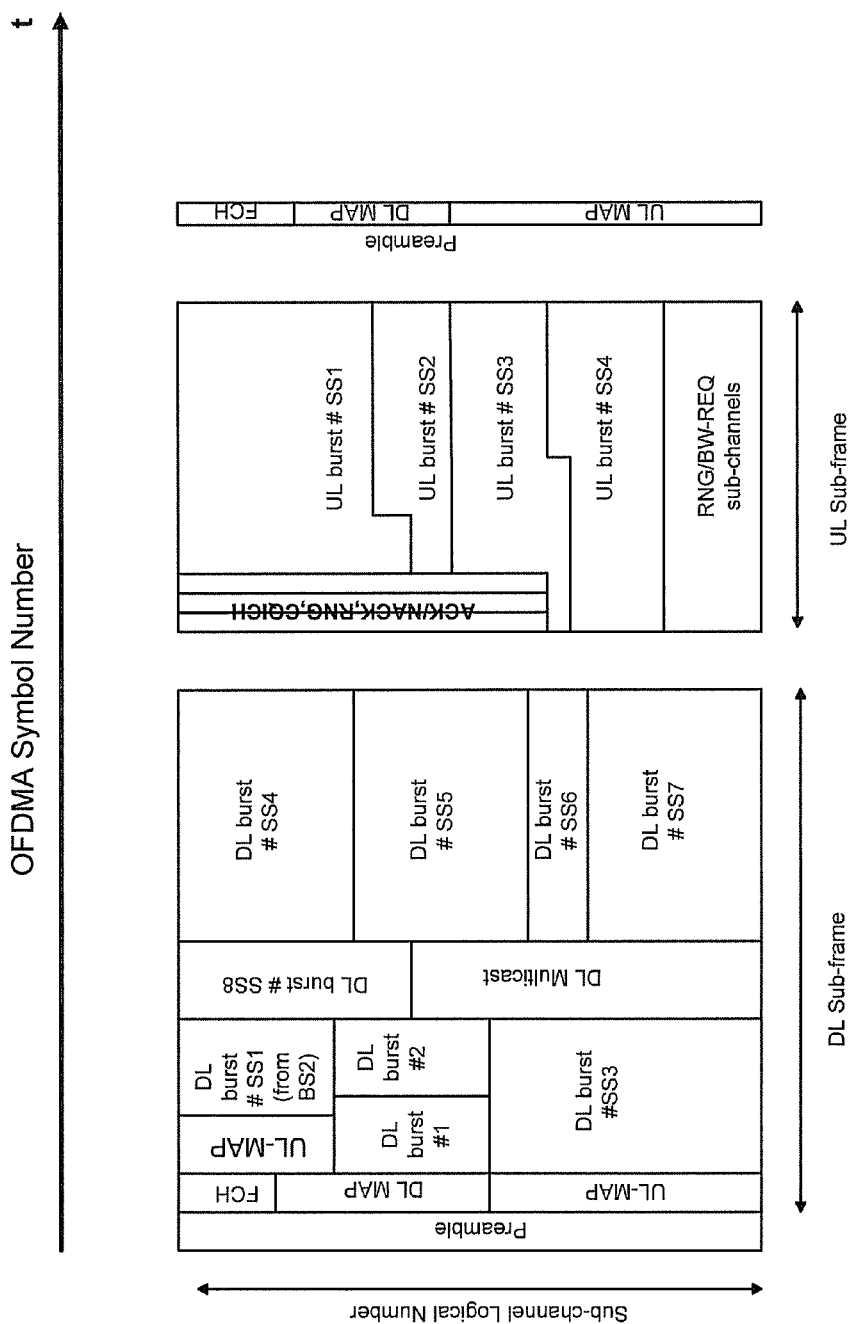
FIG. 2 is a block diagram of a WiMAX frame according to an exemplary embodiment.

In WiMAX, data communications between a client device and a WiMAX base station 102 may take a frame format, the structure of which is illustrated in FIG. 2. Each frame includes a downlink (DL) sub-frame and an uplink (UL) sub-frame, which provide various channels and zones for communicating different types of data. For example, in the DL sub-frame, a base station typically broadcasts a preamble, an uplink map (UL-MAP) message, a downlink map (DL-MAP) message, a Frame Control Header (FCH), and various DL burst messages. Some messages in the DL sub-frame, such as the preamble, UL-MAP, and DL-MAP may be available to any client device within range of the transmitting base station. On the other hand, some parts of the DL sub-frame, such as DL burst messages, may be intended for specific client devices.

Viewing the DL sub-frame in greater detail, the preamble is typically the first OFDM symbol in each WiMAX frame and may be used by a client device for synchronization with a base station. Following the preamble is the FCH, which may provide frame configuration information. For example, the FCH may indicate the length of the UL-MAP message and/or the DL-MAP message, the coding scheme to be used, and/or which sub-channels are useable. The UL-MAP and DL-MAP messages may provide sub-channel allocation, as well as other control information for the UL sub-frame and DL sub-frame, respectively. For instance, a base station may determine the number of time slots that each client device will be allocated in the UL sub-frame, and include this information in the UL-MAP at the beginning of each frame. The WiMAX frame structure, including aspects not described herein, is set forth in greater detail in the 802.16 standard and extensions.

When a client device equipped with a WiMAX chipset (such as devices 104-120) powers on, it typically engages in an initial system acquisition step to set up a connection. In the system acquisition step, the device looks at a particular frequency, in search of a preamble. Once the client device finds the preamble, it has found a WiMAX base station 102 and may attempt to establish a connection with the base station by engaging in initial ranging with the base station.

Figure 3:
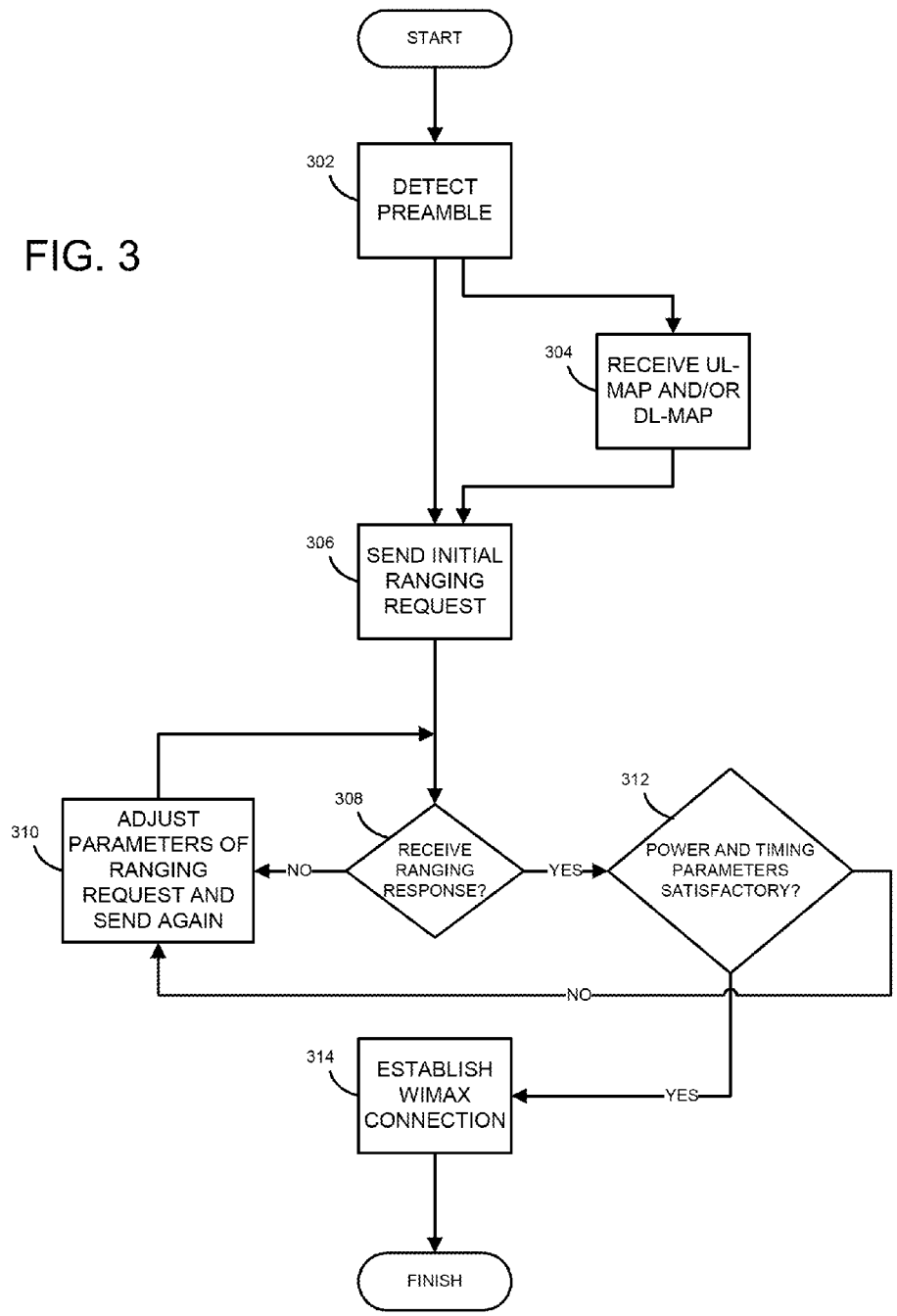
FIG. 3 is a simplified flow chart illustrating the initial ranging process in WiMAX according to an exemplary embodiment.

FIG. 3 is a simplified flow chart illustrating the initial ranging process in WiMAX. Initially, the client device detects the preamble, which indicates that WiMAX service may be available from the base station, as shown by block 302. At or near that time, the client device may also detect and receive the DL-MAP and/or UL-MAP from the same base station, as shown by block 304. Once the client device detects the preamble from a base station, the client device may send an initial ranging request to that base station, as shown by block 306. The next step depends on whether or not a ranging response is received, as illustrated by block 308. If no ranging response is received, the client device may adjust parameters of the initial ranging request, and send an initial ranging request with the adjusted parameters to the BTS, as shown by block 310. Generally, as long as no ranging response is received, the client device may continue to send initial ranging requests, increasing the power level and/or selecting a different initial ranging code in the successive requests, until a ranging response is received from the base station. Further, the client device may wait for an exponential backoff time or for another predetermined period of time between ranging requests.

Client devices typically send ranging requests via ranging sub-channels, which may be part of the UL sub-frame. In the case of an initial ranging request, the request is sent via an initial ranging (IR) subchannel in the UL sub-frame. IR subchannels are contention-based subchannels, meaning that multiple WCDs may use the same IR subchannel at the same time for initial ranging. To send an initial ranging request, a client device may transmit an initial ranging request over an IR subchannel for a two-symbol duration. Specifically, a WiMAX device selects one of the ranging codes allocated for initial ranging requests and sends a ranging request including the initial ranging code to the WiMAX base station. According to WiMAX, the initial ranging code is selected at random from the 64 ranging codes designated for initial ranging.

When the base station receives the ranging request, the base station may send a ranging response to the client device. The response may indicate either that the power and timing parameters are satisfactory, or that the parameters should be adjusted, as shown by block 312. If the parameters should be adjusted, the client device adjusts accordingly, as shown by block 310. This back and forth process will continue until the base station is satisfied with the parameters of the connection (e.g., that the client device is assigned the appropriate subchannel, with the appropriate power and timing characteristics, etc.), at which point the base station may send a ranging response that includes a specific frequency, a specific bandwidth, a specific timeslot, and/or specific coding for the client device to use. This establishes a dedicated subchannel between the base station and the device. The client device can then proceed to establish a connection with the base station, as shown by block 314.

When a ranging response is received, the response may indicate either that the power and timing parameters are satisfactory, or that the parameters should be adjusted, as shown by block 312. If the parameters should be adjusted, the client device adjusts accordingly, as shown by block 310. This back and forth process will continue until the base station is satisfied with the parameters of the connection (e.g., that the client device is assigned the appropriate subchannel, with the appropriate power and timing characteristics, etc.), at which point the base station may send a ranging response that includes a specific frequency, a specific bandwidth, a specific timeslot, and/or specific coding for the client device to use. This establishes a dedicated subchannel between the base station and the device. The client device can then proceed to establish a connection with the base station, as shown by block 314.

More specifically, after establishing a dedicated sub-channel, the WiMAX device sends a response/ack message back to the base station. At this point, the device has not yet registered with the network, e.g., undergone authentication or higher application levels in the OSI reference model. Rather, the initial ranging process establishes the OSI Layer 1 (RF) settings for communication. After the initial ranging is completed, the device enters a session establishment step. This step occurs at Layer 2 of the OSI reference model and higher levels. This could involve the device registering with the network, registering with application servers, services, etc. These steps are fully described in the WiMAX standard and not discussed in detail herein.

Returning to block 304, the client device may detect the UL-MAP or DL-MAP before sending an initial ranging request. The UL-MAP and DL-MAP may generally include information that describes the structures of the uplink sub-frame and the downlink sub-frame, respectively. Thus, WiMAX devices may not process the DL-MAP or UL-MAP before sending an initial ranging request, as illustrated by the fact that block 204 may be bypassed. On the other hand, in order to synchronize with the base station, a client may use the time and frequency offset information provided by the UL-MAP and the DL-MAP. As a result, the client may be configured to process the UL-MAP and/or the DL-MAP before sending a ranging request.

In an exemplary method, the UL-MAP or DL-MAP may also include headers indicating a QoS type and/or a spreading factor to be used to request particular QoS levels. As a result, before sending a ranging request, a device may look to the UL-MAP and/or DL-MAP to determine the various QoS levels that are available from a particular base station and/or the spreading codes that should be used to request certain QoS levels. The device can then use the spreading code that corresponds to its desired QoS level when sending the initial ranging request.

It should be understood that the invention may be described herein by way of example, with reference to implementations involving one of the WiMAX ranging processes—usually initial ranging. However, it should be understood that the examples set forth herein may apply equally to any WiMAX ranging process, without departing from the scope of the invention.

Figure 4:
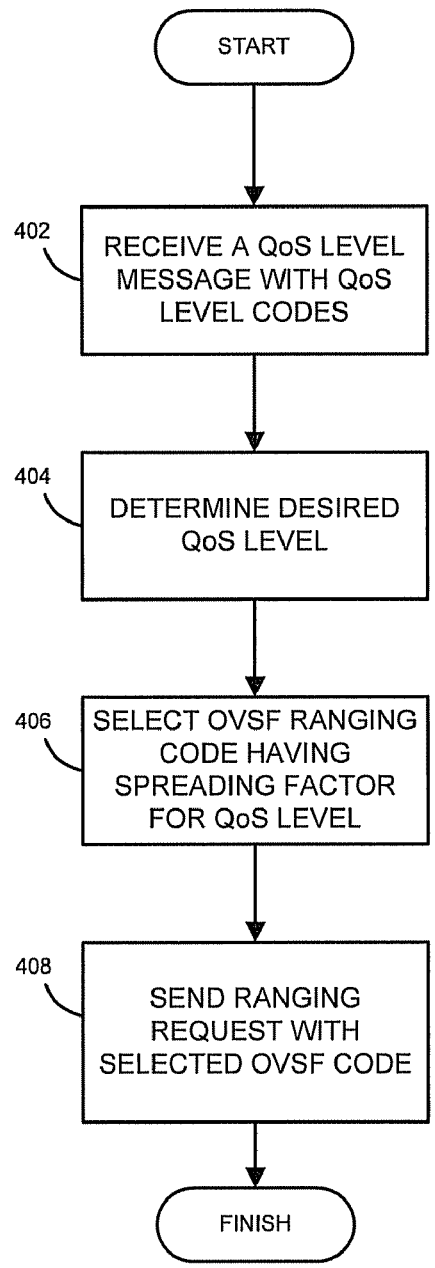
FIG. 4 is a simplified flow chart illustrating a method for ranging according to an exemplary embodiment.

FIG. 4 is a simplified flow chart illustrating a method for ranging using OVSF ranging codes. The method may be carried out by a client device operating in a WiMAX network that provides service at a plurality of QoS levels. The client device first receives a QoS level message, which includes one or more spreading factor codes, as shown by block 402. The spreading factor codes indicate the spreading factors that should be used to request certain QoS levels. The client device then determines a desired QoS level, as shown by block 404 (a step which may also be performed prior to receiving the QoS level message). Then, based on the spreading factor codes included in the QoS level message, the client device selects an OVSF code having a spreading factor for the desired QoS level, as shown by block 406. The client device then sends a ranging request that includes the selected OVSF ranging code to the WiMAX base station, as shown by block 408.

Figure 5:
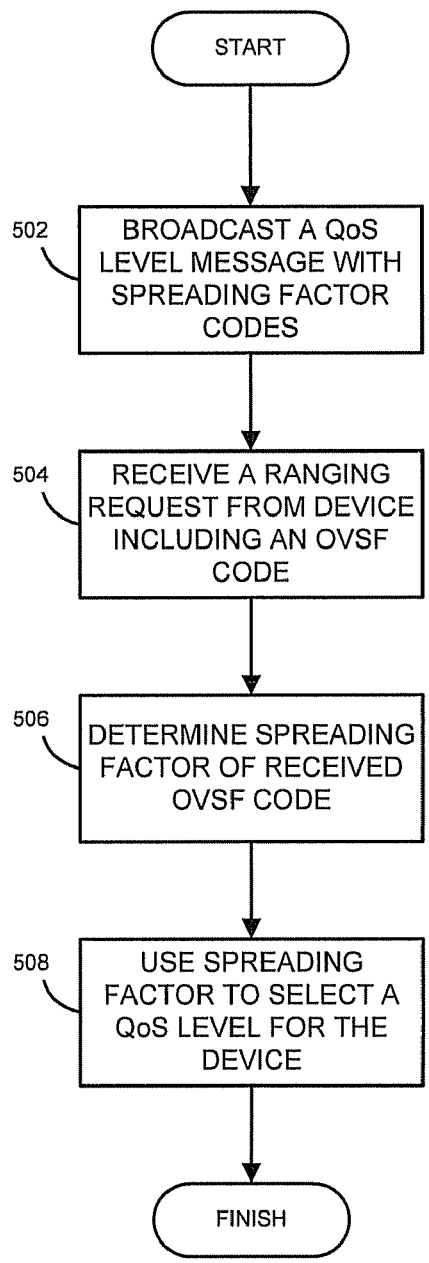
FIG. 5 is another simplified flow chart illustrating a method for ranging according to an exemplary embodiment.

FIG. 5 is another simplified flow chart illustrating a method for ranging. This method may be carried out in a WiMAX communication system configured to provide service at a plurality of QoS levels. In an exemplary embodiment, the method is carried out by a WiMAX base station. First, the WiMAX base station broadcasts a QoS level message including spreading factor codes, as shown by block 502. Each spreading factor code indicates a spreading factor for a particular QoS level. In an exemplary embodiment, the QoS level message is broadcast in the WiMAX frame via the UL-MAP or DL-MAP. As described in FIG. 4, a client device may receive the QoS level message and use the included spreading factor codes to send a ranging request that includes an OVSF ranging code. Accordingly, the WiMAX base station next receives a ranging request from a client device that includes an OVSF ranging code, as shown by block 504. The base station then determines the spreading factor of the OVSF ranging code, as shown by block 506. The base station can then use the spreading factor to select a QoS level at which to provide service to the device, as shown by block 508.

Figure 6A:
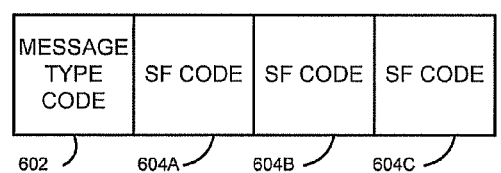
FIG. 6A is a simplified block diagram illustrating a section of a UL-MAP message according to an exemplary embodiment.

FIG. 6A is a simplified block diagram illustrating a section 600 of a UL-MAP message incorporating spreading factor codes that can be used to request various QoS levels. The message 600 includes a series of 2-bit symbols, including message type code 602 and spreading factor codes 604A-604C. In particular, a device may, based on the received spreading factor codes, select an OVSF ranging code for its desired QoS level.

The message type code 602 indicates the ranging process for which section 600 is providing spreading factor codes. In an exemplary embodiment, message type code 602 is a 2-bit symbol representing one of the four WiMAX ranging processes (e.g., initial, periodic, etc.). As one example, message type codes for initial ranging, periodic ranging, bandwidth requests, and hand-off ranging may be 00, 01, 10, and 11, respectively. Other examples are also possible.

Spreading factor codes 604A-604C may each indicate the spreading factor to be used to request a particular QoS level. For instance, spreading factor codes of 00, 01, 10, and 11, may indicate spreading factors of 4, 8, 16, and 32 respectively. If three QoS levels are available (for example, listed from highest QoS to lowest QoS: gold, silver, and bronze), the base station may be configured to transmit spreading factor codes corresponding to these service levels in a predetermined order. Thus, the spreading factor codes 604A-604C may indicate spreading factors for gold, silver, and bronze, respectively. As an example, if 604A-604C are 00, then 01, then 10, the spreading factors for gold, silver and bronze would be 4, 8, and 16, respectively.

Figure 7:
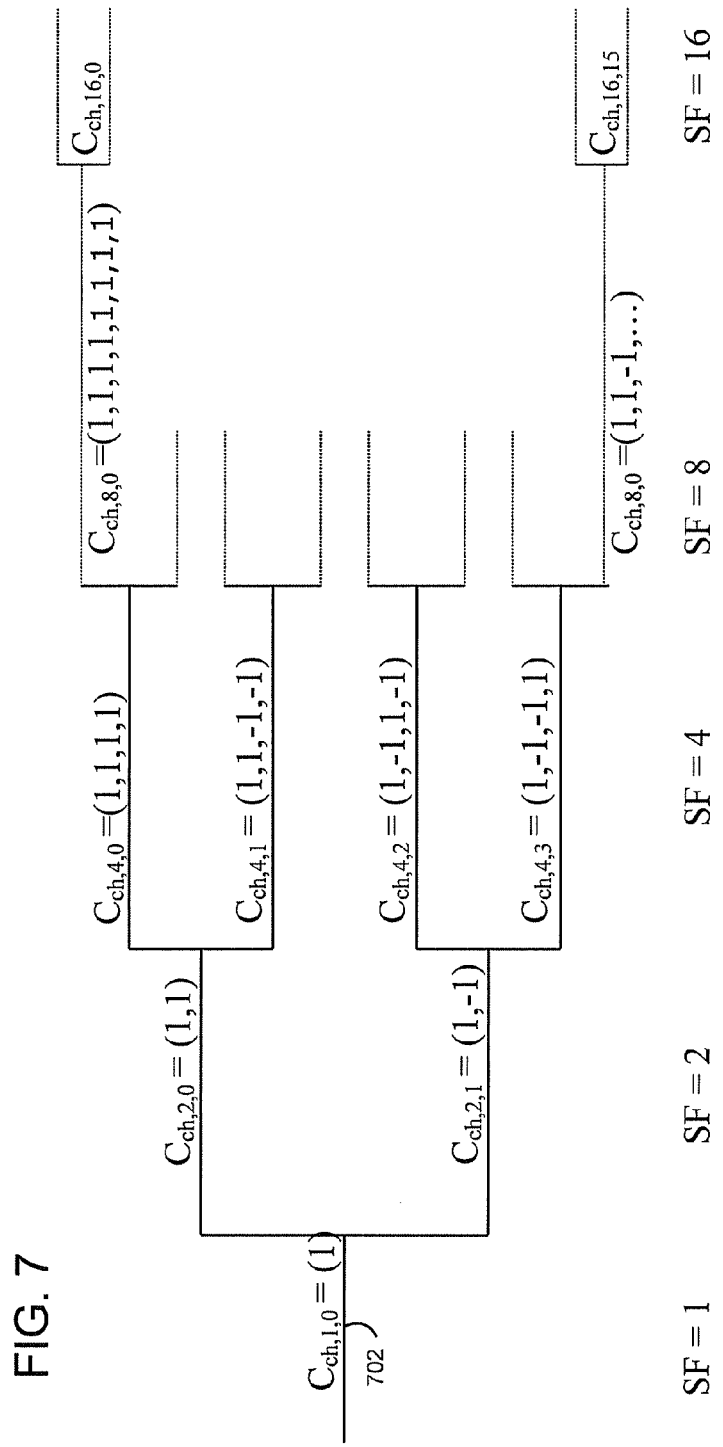
FIG. 7 is an OVSF code generation tree according to an exemplary embodiment.

Given the spreading factor code, a device may select an OVSF code having the appropriate spreading factor, and include this code in its ranging request. Specifically, a client device may use an OVSF code generation tree to select an OVSF ranging code having the appropriate spreading factor. A typical OVSF code generation tree 700 is shown in FIG. 7. For example, to request the gold QoS level when the spreading factor for gold is 8, a device may select an OVSF code from the set: {(1,1,1,1), (1,1,−1,−1), (1,−1,1,−1), (1,−1,−1, 1)}. As one specific example, the device might select the OVSF ranging code (1, 1,−1,−1) and then send a ranging request including this ranging code.

OVSF codes having different spreading factors vary in distance from the root 702 of the code generation tree (e.g. the code with a spreading factor of one), with the length of OVSF codes increasing as the distance from the root increases. Shorter bit-length OVSF codes, which are closer to the root, have a higher priority than longer bit-length OVSF codes (i.e., shorter bit-length codes will be given more bandwidth, or treated preferentially in some manner). More specifically, OVSF codes that are closer to the root 702 of the code generation tree 700 have greater spreading factor gain, and thus are of higher priority than OVSF codes that are further from the root, which have lower spreading factor gain. OVSF codes and OVSF code generation trees are generally well known in the art, and thus are not discussed in greater detail here. It should be understood, however, that code generation tree 700 illustrates one of many possible code generation trees.

Figure 6B:
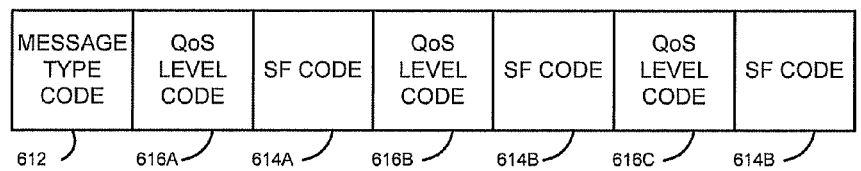
FIG. 6B is another simplified block diagram illustrating a section of a UL-MAP message according to an exemplary embodiment.

Other arrangements of the QoS level codes in the broadcast message are possible. For instance, FIG. 6B is a simplified block diagram illustrating a section 610 of a UL-MAP message incorporating QoS level codes and spreading factor codes that can be used by a device to request various QoS levels. Section 610 is similar to section 600 of FIG. 6A, but includes QoS level codes interspersed between spreading factor codes. Specifically, section 610 includes a message type code 612, followed by QoS level code/spreading factor code pairs (e.g. QoS level code 616A and spreading factor code 614A, QoS level code 616B and spreading factor code 614B, and QoS level code 616C and spreading factor code 614C, which may be referred to as code pair A-code pair C, respectively). Each code pair A-C indicates a QoS level and a spreading factor for that level.

It should be understood that format of section 610 may generally provide the benefits attributed to the format of section 600, as well as other benefits. For instance, to adjust the bandwidth allocated to a particular QoS level, a WiMAX base station may broadcast a UL-MAP that includes a section such as section 600 or section 610. Specifically, a base station may adjust bandwidth allocated for a QoS level by adjusting the spreading factor for a QoS level. This capability may be useful when the number of high-QoS-level users (i.e. gold-level subscribers) in a coverage area increases. In this scenario, the base station might adjust the spreading factors such that more connections and a greater percentage of the available bandwidth are dedicated to gold-level subscribers. As another example, in a location where there are a small number of devices or where there are few connections being used by higher QoS level subscribers, greater bandwidth may be allocated for lower QoS levels. As a specific example, the bronze service level may be assigned a lower spreading factor (e.g. a spreading factor of 8 or 16) at a location where there are only three or four active gold and silver level subscribers. Thus, while fewer ranging codes are available for bronze level service, each bronze level subscriber can be allocated more bandwidth.

It should be understood that a base station and/or a client device may recognize that a spreading factor code represents a different spreading factor when paired with different QoS levels. For example, spreading factor codes 00, 01 and 10 may indicate spreading factors of 4, 8, and 16, respectively, when paired with the gold QoS level code, but may indicate spreading factors of 8, 16, and 32 when paired with the silver QoS level code. This feature may be particularly useful, as fewer connections may be available for a high (e.g. gold or silver) QoS level, which provides higher bandwidth service, than may be available for a low (e.g. silver or bronze) QoS level. Thus, for higher QoS levels, shorter spreading factors (4, 8 and 16, for instance) may be employed, whereas for lower QoS levels, larger spreading factors (16, 32, and 64, for instance) may be employed.

It should also be understood that a base station and/or a client device may recognize that a spreading factor code represents different spreading factors, depending upon the ranging process indicated by the message type code. For example, a spreading factor code of 01 may indicate a spreading factor of 8 for gold level initial ranging, and at the same time indicate a spreading factor of 4 for gold level periodic ranging. Other examples are also possible.

In addition, by using a code pair structure, such as code pairs A-C, may provide more flexibility in communicating the available ranging codes to client devices. For example, without a QoS level code, a base station may send spreading factor codes in a predetermined order so that the client device knows which spreading factor code corresponds to which QoS level. However, because a code pair indicates a QoS level and a spreading factor code for that QoS level, the code pairs need not be in a predetermined order. Thus, code pairs may be sent for just one QoS level or for a subset of available QoS levels. As a result, the base station can adjust the spreading factors for QoS levels individually, in subsets, or all at once.

As a specific example, a gold, silver, and bronze QoS levels may be represented by the QoS level codes 00, 01, and 10, respectively. Using the format "(SF code: spreading factor)" to represent the spreading factor code that corresponds to a particular spreading factor, the spreading factor codes and corresponding spreading factors for gold-level service may be (00:4), (01:8), (10:16), and (11:32). For silver level service, the spreading factor codes and corresponding spreading factors may be: (00:8), (01:16), (10:32), and (11:64). And for bronze level service, the spreading factor codes and corresponding spreading factors may be: (00:16), (01:32), (10:64), and (11:128). If there are 16 gold connections, 16 silver connections and 32 bronze connections available from a particular base station for initial ranging, the base station may broadcast a UL-MAP message including the following section, according to the general format illustrated by FIG. 5:

| 00 | 00 | 10 | 01 | 01 | 10 | 01 |
|----|----|----|----|----|----|----|

In this section, the first two bits are the message type code, in this case 00 for initial ranging. The next four bits represent a code pair, including a QoS level code (00) followed by a spreading factor code (10), which indicates the spreading factor of 16 for the gold service level. The code pair for the gold level is followed by code pairs for the silver service level (a QoS level code of 01, with an spreading factor Code of 01 indicating a spreading factor of 16) and the bronze service level (a QoS level code of 10, with a spreading factor code of 01 indicating a spreading factor of 32).

Generally, the sum of spreading factors for a given type of ranging should be less than or equal to the number of ranging codes allocated for that type of ranging. Since WiMAX specifies a fixed quantity of 64 ranging codes for each type of ranging, the sum of the spreading factors for all QoS levels should be less than or equal to 64 for each type of ranging. However, the present invention may be used in conjunction with aspects of co-pending U.S. patent application entitled "Dynamic Allocation of WiMAX Ranging Codes," which discloses a method and system for adjusting the number of ranging codes assigned to for each type of ranging request.

As an example, in a certain location, initial ranging requests may occur more frequently than hand-off ranging requests and bandwidth requests. Therefore, a base station serving this location may assign 128 ranging codes for initial ranging requests and 64 ranging codes for periodic requests, while only assigning 32 ranging codes each for hand-off ranging requests and bandwidth requests. In this scenario, the sum of spreading factors for a given type of ranging need not be limited to 64. Since there are 128 initial ranging codes, the sum of spreading factors for initial ranging should be 128 or less. On the other hand, the sum of spreading factors for hand-off ranging requests (and bandwidth requests) should be 32 or less.

It should be understood that while the examples described generally herein involve three QoS levels, any number of QoS levels are possible. As such, the size of the message type code, spreading factor codes, and/or QoS levels may be adjusted. For example, if more than four ranging processes are available, the message type code may be expanded to three bits or more to accommodate the additional ranging processes. As another example, QoS level codes and/or spreading factor codes may be reduced to one bit or expanded to three bits or more to accommodate less or more QoS levels.

Example embodiments of the present invention have been described above. Those skilled in the art will understand, however, that changes and modifications may be made to these embodiments without departing from the true scope and spirit of the invention, which is defined by the claims.

We claim:

1. In a WiMAX communication system configured to provide service at a plurality of quality of service (QoS) levels, a method for ranging comprising:
   broadcasting a QoS level message in a downlink subframe, wherein the QoS level message comprises one or more spreading factor codes, and wherein each spreading factor code indicates a spreading factor for a particular QoS level;
   receiving a ranging request from a device, wherein the ranging request comprises an orthogonal variable spreading factor (OVSF) code, wherein the OVSF code was selected according to the one or more spreading factor codes;
   determining a spreading factor of the OVSF code in the received ranging request; and
   using the spreading factor as a basis for selecting a QoS level at which to provide service to the device.

2. The method of claim 1, wherein the QoS level message is an uplink MAP (UL-MAP) message.

3. The method of claim 1, wherein the QoS level message is a downlink MAP (DL-MAP) message.

4. The method of claim 1, wherein the QoS level message further comprises one or more QoS level codes for one or more of the QoS levels.

5. The method of claim 4, wherein the QoS level message comprises one or more code pairs, wherein each code pair comprises a QoS level code and a spreading factor code that indicates the spreading factor for the QoS level code.

6. The method of claim 1 wherein the one or more spreading factor codes are included in the QoS level message in a predefined order, wherein the predefined order indicates which of the one or more spreading factor codes indicates the spreading factor for which of the one or more QoS levels.

7. The method of claim 1, wherein the WiMAX communication system is configured to engage in one or more ranging processes.

8. The method of claim 7, wherein the ranging processes comprise initial ranging, periodic ranging, bandwidth requests, and hand-off requests.

9. The method of claim 7, wherein the QoS level message further comprises a message type code, wherein the message type code indicates which of the ranging processes the spreading factor codes indicate spreading factors for.

10. A method for WiMAX ranging, wherein a WiMAX base station is configured to provide service at a plurality of QoS levels, the method comprising:
    receiving a QoS level message, wherein the QoS level message comprises one or more spreading factor codes, wherein each spreading factor code indicates a spreading factor for a particular QoS level;
    determining a desired QoS level at which to request service from the WiMAX base station;
    using the spreading factor codes as a basis for selecting an OVSF ranging code having the spreading factor for the desired QoS level; and
    sending a ranging request to the WiMAX base station, wherein the ranging request comprises the selected OVSF code.

11. The method of claim 10, further comprising, before receiving the QoS level message, detecting a preamble in a downlink sub-frame, wherein the preamble is broadcast by a WiMAX base station.

12. The method of claim 10, wherein the ranging request comprises an initial ranging request, a periodic ranging request, a bandwidth request, or a hand-off ranging request.

13. The method of claim 10, wherein receiving the QoS level message comprises receiving a UL-MAP message or a DL-MAP message, wherein the UL-MAP message or the DL-MAP message comprises the QoS level message.

14. A WiMAX communication system configured to perform ranging and configured to provide service at a plurality of QoS levels, the system comprising:
    a transmitter configured to broadcast a QoS level message, wherein the QoS level message comprises one or more spreading factor codes, and wherein each spreading factor code indicates a spreading factor for a particular QoS level; and
    a receiver configured to receive a ranging request from a device, wherein the ranging request comprises an orthogonal variable spreading factor (OVSF) code having a spreading factor selected by the device based at least in part on the spreading factor codes;
    wherein the WiMAX communication system is further configured to:
        determine the spreading factor of the OVSF code in the received ranging request; and
        use the spreading factor as a basis for selecting a QoS level at which to provide service to the device.

15. The WiMAX communication system of claim 14, wherein the WiMAX communication system is implemented in a WiMAX base station.

16. The WiMAX communication system of claim 14, wherein the QoS level message is broadcast in a downlink sub-frame.

17. The WiMAX communication system of claim 16, wherein the downlink sub-frame comprises an uplink MAP (UL-MAP) and a downlink MAP (DL-MAP), and wherein the QoS level message is broadcast in the UL-MAP or the DL-MAP of the downlink sub-frame.

18. The WiMAX communication system of claim 14, wherein the QoS levels comprise a first QoS level having the highest QoS, a second QoS level having an intermediate QoS, and a third QoS level having the lowest QoS.

19. The WiMAX communication system of claim 18, wherein the first QoS level is referred to as gold level service, wherein the second QoS level is referred to as silver level service, and wherein the third QoS level is referred to as bronze level service.

* * * * *